(12) United States Patent
Blivet

(10) Patent No.: US 7,887,097 B2
(45) Date of Patent: Feb. 15, 2011

(54) COUPLING DEVICE FOR A MOTOR VEHICLE FLUID CIRCUIT

(75) Inventor: Philippe Blivet, Rennes (FR)

(73) Assignee: Legris SAS, Rennes (FR)

( * ) Notice: Subject to any disclaimer, the term of this patent is extended or adjusted under 35 U.S.C. 154(b) by 0 days.

(21) Appl. No.: 12/423,917

(22) Filed: Apr. 15, 2009

(65) Prior Publication Data
US 2009/0224531 A1 Sep. 10, 2009

Related U.S. Application Data

(63) Continuation of application No. PCT/FR2007/001679, filed on Oct. 15, 2007.

(51) Int. Cl.
F16L 55/00 (2006.01)
F16L 43/00 (2006.01)
F16L 37/12 (2006.01)
F16L 21/06 (2006.01)

(52) U.S. Cl. .......... 285/45; 285/179; 285/179.1; 285/308; 285/373

(58) Field of Classification Search .......... 285/45, 285/308, 373, 419, 179, 179.2, 182, 183, 285/86, 93, 313, 179.1; 138/110
See application file for complete search history.

(56) References Cited

U.S. PATENT DOCUMENTS

| | | | | |
|---|---|---|---|---|
| 1,156,145 A * | 10/1915 | Jenkins | ...... | 285/64 |
| 1,904,627 A * | 4/1933 | Olevin | ...... | 285/45 |
| 3,367,358 A * | 2/1968 | Rentschler | ...... | 137/375 |
| 3,711,633 A * | 1/1973 | Ghirardi et al. | ...... | 174/135 |
| 4,192,352 A * | 3/1980 | Hakamada et al. | ...... | 138/149 |
| 4,429,907 A * | 2/1984 | Timmons | ...... | 285/373 |
| 4,452,097 A * | 6/1984 | Sunkel | ...... | 74/502.4 |
| 4,667,505 A * | 5/1987 | Sharp | ...... | 73/40.5 R |
| 4,846,505 A * | 7/1989 | Muller et al. | ...... | 285/23 |
| 4,881,760 A * | 11/1989 | Runkles et al. | ...... | 285/93 |
| 5,022,685 A * | 6/1991 | Stiskin et al. | ...... | 285/45 |
| 5,031,940 A * | 7/1991 | Stefanos | ...... | 285/45 |
| 5,134,852 A * | 8/1992 | Weeks | ...... | 60/323 |
| 5,158,114 A * | 10/1992 | Botsolas | ...... | 138/149 |
| 5,203,522 A * | 4/1993 | White et al. | ...... | 244/17.11 |
| 5,266,740 A * | 11/1993 | Hsu | ...... | 174/72 C |
| 5,653,475 A * | 8/1997 | Scheyhing et al. | ...... | 285/54 |
| 5,924,746 A * | 7/1999 | Fixemer | ...... | 285/93 |
| 5,992,895 A * | 11/1999 | Steinkamp | ...... | 285/45 |
| 6,106,028 A * | 8/2000 | Godeau et al. | ...... | 285/319 |
| 6,179,514 B1 * | 1/2001 | Cheng | ...... | 403/377 |
| 6,311,734 B1 * | 11/2001 | Petrovic | ...... | 138/110 |

(Continued)

FOREIGN PATENT DOCUMENTS

DE 103 18 601 A1 11/2004

(Continued)

Primary Examiner—James M Hewitt
(74) Attorney, Agent, or Firm—John A. Molnar, Jr.

(57) ABSTRACT

Coupling device for a fluid circuit in a motor vehicle, the device including: a functional member of a plastic material that is provided with two or more types of connection, at least one of which includes a manually-accessible member projecting from the outside surface of the functional member; and a protective metal housing formed by two shells joined by a seam around the functional member, the housing being provided with a window giving access to the manually-accessible member.

9 Claims, 2 Drawing Sheets

U.S. PATENT DOCUMENTS

| | | | |
|---|---|---|---|
| 6,762,365 B2* | 7/2004 | Inoue et al. | 174/84 R |
| 6,871,878 B2* | 3/2005 | Miros | 285/124.5 |
| 6,926,311 B2* | 8/2005 | Chang et al. | 285/317 |
| 6,979,026 B2* | 12/2005 | Kasahara et al. | 285/93 |
| 7,062,836 B1* | 6/2006 | Sorgi | 29/525.01 |
| 7,104,571 B2* | 9/2006 | Inoue et al. | 285/93 |
| 7,448,653 B2* | 11/2008 | Jensen et al. | 285/307 |
| 7,537,478 B2* | 5/2009 | Foltz et al. | 439/468 |
| 7,581,564 B2* | 9/2009 | Tanaka et al. | 138/110 |
| 2003/0080555 A1* | 5/2003 | Griffioen et al. | 285/133.11 |
| 2003/0094809 A1* | 5/2003 | Inoue | 285/93 |
| 2003/0121691 A1 | 7/2003 | Inoue et al. | |
| 2003/0184083 A1* | 10/2003 | Linam et al. | 285/45 |
| 2004/0135371 A1* | 7/2004 | Masuda et al. | 285/423 |
| 2005/0001425 A1* | 1/2005 | deCler et al. | 285/305 |
| 2006/0151995 A1* | 7/2006 | Saarem et al. | 285/93 |

FOREIGN PATENT DOCUMENTS

| | | |
|---|---|---|
| DE | 10 2004 053 541 A1 | 5/2006 |
| EP | 0 629 806 A2 | 12/1994 |

\* cited by examiner

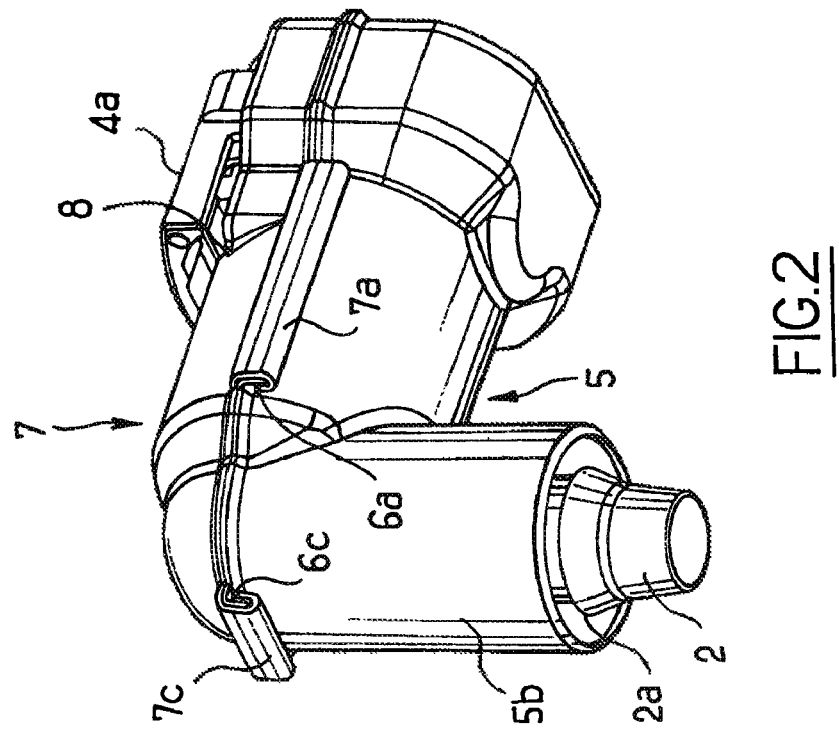
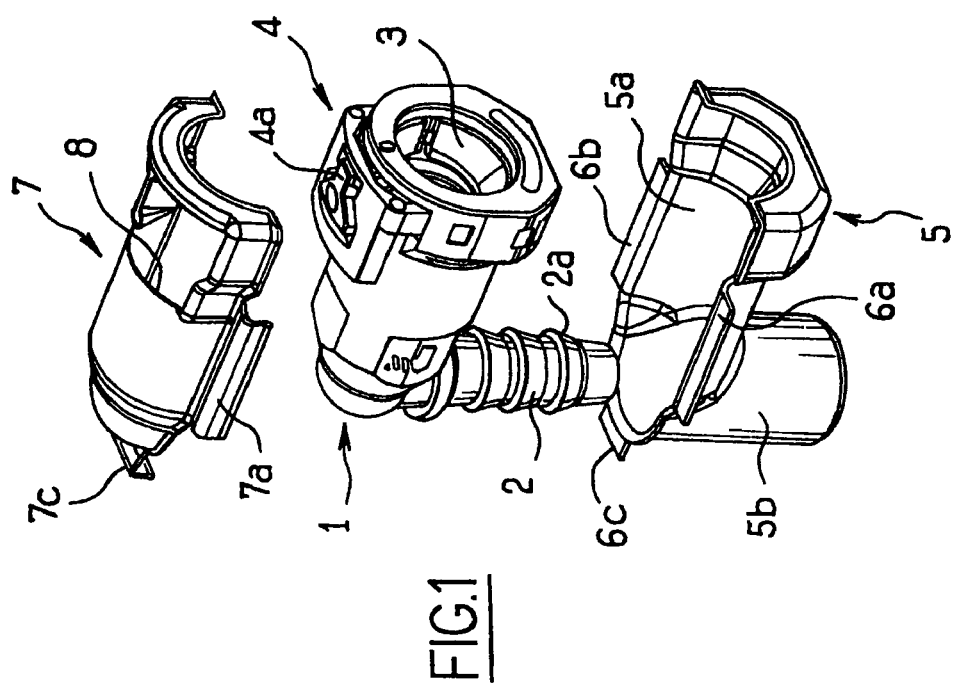

US 7,887,097 B2

COUPLING DEVICE FOR A MOTOR VEHICLE FLUID CIRCUIT

CROSS REFERENCE TO RELATED CASES

This application is continuation of copending international Application No. PCT/FR07/001679 filed Oct. 15, 2007, which designated the United States, and which claims priority to French Patent Application 0609211, filed Oct. 20, 2006, the disclosure of each of which is expressly incorporated herein by reference.

BACKGROUND OF THE INVENTION

The present invention relates to a coupling device for coupling the various pipes forming a fluid circuit in a motor vehicle to one another or to other elements (filters, pumps, tanks).

The fuel circuit of a motor vehicle is an element to which motor manufacturers devote a large amount of attention in terms of safety. In the event of an accident, a rupture in this circuit considerably increases the risk of the vehicle catching fire. It is therefore appropriate to provide circuits that can withstand the accident-simulating impacts to which these circuits are subjected during testing. This requirement also applies to other vehicle fluids such as brake-fluid or power-steering circuits.

So far as couplings are concerned, it appears that metal devices behave in satisfactory manner.

However, for reasons of expense, it is out of the question to make such couplings by machining. It is therefore necessary to envisage fabricating them out of sheet metal, using fabrication methods of the stamping, hydroforming type associated with methods of cutting, folding, and bending.

Sheet-metal work involves intrinsic limits, e.g. concerning the geometrical shapes that can be obtained, the minimum dimensions that can be achieved, the resulting surface qualities, compliance with close tolerances. In addition, it is not possible to achieve sharp angles, such that connections by means of a spigot with sharp-edge peripheral portions in relief can be replaced only by a spigot with beads or bands in relief that require an external clamping collar.

It follows that a metal coupling produced using fabrication methods that are compatible with the market, i.e. by sheet metal working, present drawbacks compared with a coupling made of a plastic material, in particular in terms of overall size.

SUMMARY OF THE INVENTION

The invention seeks to propose an alternative to fabricating metal couplings, which alternative combines the advantages of metal couplings to withstand impacts with the advantages of plastic material couplings in terms of compactness, and the shapes and sharp edges that make it easier to make connections.

Thus to this end, the invention provides a coupling device for a fluid circuit in a motor vehicle, the device comprising a functional member of plastic material that is provided with at least two types of connection means, at least one of which includes a manually-accessible member projecting from the outside surface of the functional member, and according to the invention the device includes a protective metal box formed by two shells united by a seam around the functional member, the box being provided with a window giving access to the manually-accessible member. The term "window" should be understood as designating an opening having a continuous edge, optionally intersected by the seam plane.

This configuration imparts good strength to the protective shell of the invention. Nevertheless, the window is preferably provided by being cut out in a single shell so that the seam does not pass through any of the edges of the window. This increases ability to withstand impacts.

Amongst the advantages of the invention, mention can also be made of the fact that the shells, which do not contribute to the coupling function, can be dimensioned with less precision than is required for the bodies of metal couplings. As a result, fabrication is less expensive and does not excessively increase the total price of the coupling device.

When the other one of the connection means is a serrated spigot, at least one of the shells constitutes means for tightening a tube onto the connection spigot, thereby reinforcing mutual connection therebetween. This is provided merely by radially compressing a sleeve-shaped cylindrical portion of the shell, or by flattening or folding down a tongue cut out in the sleeve-shaped portion of the shell that surrounds the connection spigot and the tube associated therewith.

If so required by the circuits, the coupling devices may be fastened to a structural element of the vehicle specifically via the box of the invention.

Other characteristics and advantages of the invention appear from the following description of an embodiment of the coupling device in an angled or bend configuration.

BRIEF DESCRIPTION OF THE DRAWINGS

Reference is made to the accompanying drawings, in which:

FIG. 1 is an exploded view of an angled coupling device of the invention;

FIG. 2 is an external perspective view of the device;

Figure 4:
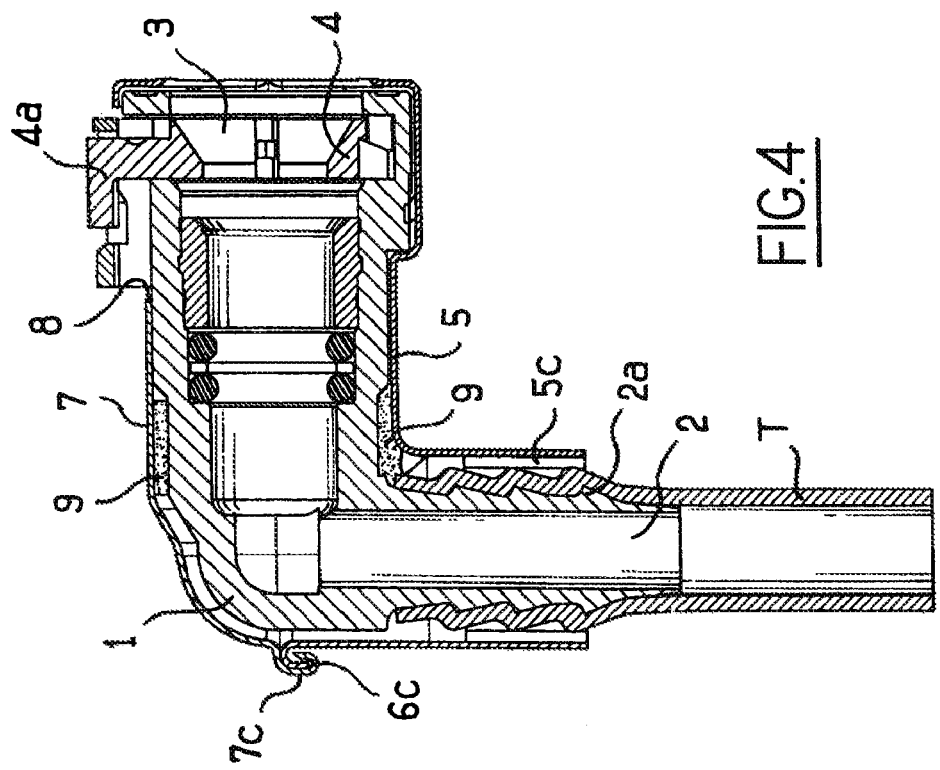
FIG. 4 is a cross-section view of FIG. 3.

The drawings will be described further in connection with the following Detailed Description of the Invention.

DETAILED DESCRIPTION OF THE INVENTION

In the figures, the coupling device shown comprises a body 1 of plastic material, here of angled shape, having an internal channel and two different connection means, one formed by a serrated spigot 2 and the other formed by a housing 3 capable of receiving a collared end fitting, the housing being provided with a latch 4 and with drive means 4a projecting from the outside surface of the body 1. This body 1 fitted as described above constitutes a conventional plastic material coupling commonly used for making hydraulic circuits.

When the coupling is to be used in the field of conveying a dangerous or polluting fluid in a motor vehicle, the coupling is provided with a kind of metal armor in the form of box made up of two shells 5 and 7. The shell 5 defines a cradle 5a, and perpendicularly to the axis of the cradle, a sleeve 5b where the cradle is suitable for receiving the bottom portion of the main body 1, and the sleeve is suitable for receiving the spigot 2. A shell 7, likewise in the form of a cradle, is provided to co-operate with the shell 5 so as to enclose the body 1, this co-operation being achieved via a "seam", i.e. the matching edges of the shells 5 and 7 are joined by any appropriate means (folding, welding, riveting, adhesive, etc.), which edges lie in a single plane in this example. Specifically, the shell 5 is provided with three external tabs 6a, 6b, and 6c, while the shell 7 likewise has three tabs 7a, 7b (not visible in the figure), and 7*c*. The two shells 5 and 7 are connected together by seaming performed by folding the tabs 7 onto the tabs 6 and turning them down together as shown in FIG. 2.

A feature of the shell 7 consists in the fact that it has a window 8 cut out in the metal wall constituting it so that the edge of the window is continuous. As shown in FIG. 2, this window serves to pass a member 4*a* for manually actuating the latch 4, but without that causing the mechanical strength of the shell 7 to be significantly weakened. When the box is made of two symmetrical lateral shells that are united by seaming in a plane containing the axes of the fluid channel defined by the body 1, the plane of the seam intersects the two opposite edges of the window 8, thereby somewhat weakening its ability to withstand impacts. In certain uses, this configuration can be suitable. In others it is preferable to avoid it, since the sleeve 5*b* is then not in a single piece and that can lead to drawbacks.

Figure 3:
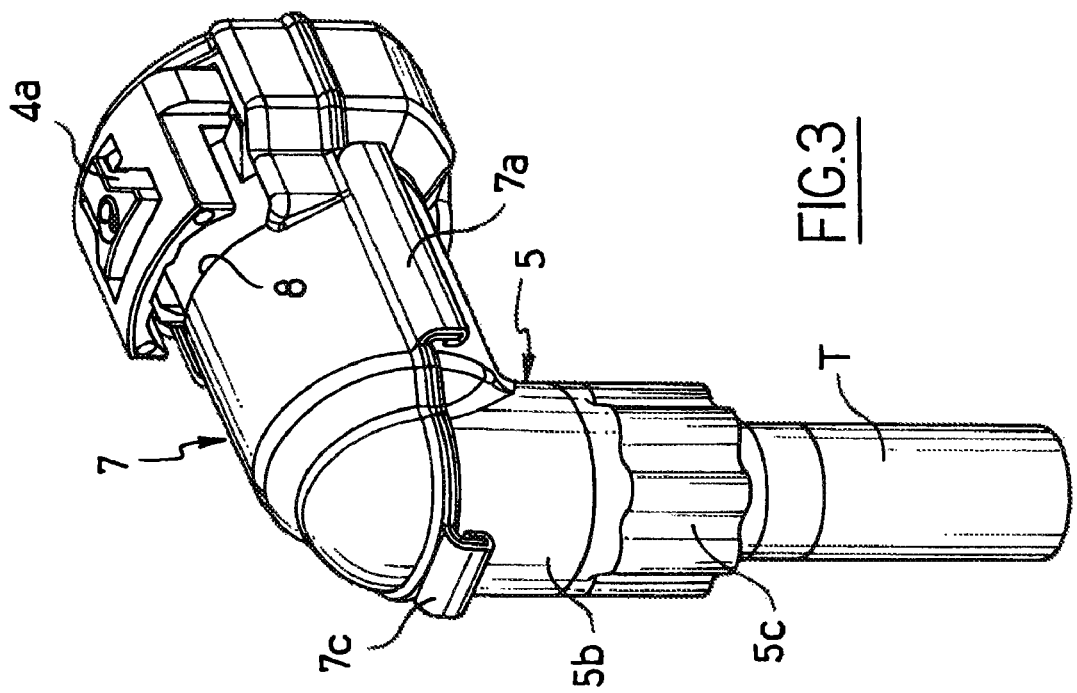
FIG. 3 is a view similar to the view of FIG. 2 showing a variant embodiment of the device of the invention.

FIGS. 3 and 4 show most of the same elements as described above, with the same references. The sleeve 5*b* of the shell 5 is deformed radially (see fluting 5*c*) to form means for clamping the tube T that covers the spigot 2 against said spigot and the serrations 2*a* that it carries. These clamping means reinforce the connection between the coupling means and the tube T, and they also serve to secure the box to the coupling. This avoids leaving clearance between the box and the coupling, which could constitute a source of noise under conditions of vibration.

Furthermore, in this respect it should be observed that the shells 5 and 7 may be provided with a resilient and absorbent lining 9 that comes into contact with the body 1 and that acts specifically to space the box apart from the body 1 and to damp relative movements between the body 1 and the box 5, 7.

Finally, it should be observed that the box 5, 7 of the invention may include, e.g. in the zones of the join plane that are not provided with seam tabs, one or more tongues (not shown in the figures) enabling the coupling device to be fastened to a structural element of the vehicle. These tongues are naturally made from the same sheet of metal that constitutes the basis for fabricating one and/or the other of the shells 5 and 7.

In addition to its capacity for better withstanding impacts, the device of the invention also withstands the high temperatures to which it might be subjected when placed close to heat sources that radiate in discontinuous manner, such as the exhaust pipes of recent diesel vehicles at times when they are burning off particles and soot. Another source of intense but discontinuous heat radiation is constituted by a brake device. The coupling of the invention enables the manufacturer to simplify the path followed by fluid, fuel, or braking oil circuits, which circuits previously needed to be designed so as to ensure that the coupling devices were remote from such heat sources.

Finally, certain portions of circuits for conveying fuel, and more generally motor vehicle fluids, are situated under the vehicle body where they are exposed to various projections such as gravel or corrosive substances (solutions for clearing snow). The coupling device of the invention presents better capacity to withstand such aggression than previously-existing devices.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A coupling assembly for a fluid circuit, the assembly comprising:
   a generally tubular body formed of a plastic material, the body having an outer surface and a first coupling end for a first connection within the fluid circuit, and a second coupling end for a second connection within the fluid circuit;
   a latching member projecting beyond the body adjacent the second end thereof;
   a first shell part having a first edge;
   a second shell part joined to the first shell part along a seam to form an enclosure, each of the first and the second shell parts being formed of a metal material and the enclosure having a first enclosure end and a second enclosure end, and a window, the body being received within the enclosure with the first enclosure end being open to the first coupling end of the body, the second enclosure end being open to the second coupling end of the body, and the window being open to the latching member such that the latching member is manually-accessible through the window for manually actuating the latch and
   wherein the body first coupling end is configured as a male end and the first enclosure end is configured as a tubular sleeve, the male end of the body being received through the sleeve.

2. The coupling assembly of claim 1 wherein the window is formed entirely in one of the shell parts.

3. The coupling assembly of claim 1 wherein the sleeve is formed integrally by one of the shell parts.

4. The coupling assembly of claim 1 further comprising a tube having a tube end received over male end of the body, the sleeve being formed to clamp the tube end between the sleeve and the male end of the body.

5. The coupling assembly of claim 1 wherein the body second coupling end is configured as a female end.

6. The coupling assembly of claim 5 wherein the female end of the body is received between the first and the second shell part.

7. The coupling assembly of claim 1 wherein the first shell part has a first edge surface and the second shell part has a second edge surface joined to the first edge surface of the first shell part to form the seam.

8. The coupling assembly of claim 7 wherein the first shell part has at least a first tab extending from the first edge surface, and the second shell part has at least a second tab extending from the second edge surface, one of the first and the second tab being folded across the seam over the other one of the first and second tab.

9. The coupling assembly of claim 1 wherein the first shell part has a first inside face and the second shell part has a second inside face, the coupling assembly further comprising a compressible lining disposed on at least a portion of one of the inside faces, the lining spacing the enclosure apart from the body.

* * * * *